United States Patent [19]

Völker

[11] Patent Number: 4,717,747
[45] Date of Patent: Jan. 5, 1988

[54] STABILIZER MIXTURES FOR VINYL CHLORIDE POLYMER MASSES

[75] Inventor: Theodor Völker, Reinach, Switzerland

[73] Assignee: Lonza Ltd., Gampel/Valais, Switzerland

[21] Appl. No.: 746,677

[22] Filed: Jun. 20, 1985

[30] Foreign Application Priority Data

Jul. 6, 1984 [CH] Switzerland .................. 3282/84

[51] Int. Cl.⁴ .................. C08K 5/15; C09K 15/06
[52] U.S. Cl. .................. 524/110; 252/407; 524/396; 524/399; 524/400
[58] Field of Search .......... 252/397, 400.61, 400.62, 252/407; 524/110

[56] References Cited

U.S. PATENT DOCUMENTS

| | | | |
|---|---|---|---|
| 1,898,363 | 2/1933 | Grenbank | 252/407 |
| 2,316,371 | 4/1943 | Strother | 524/110 |
| 3,223,660 | 12/1965 | Pulver | 524/110 |
| 3,346,536 | 10/1967 | Kauder et al. | 524/109 |
| 3,506,606 | 4/1970 | Hill | 524/110 |
| 3,660,331 | 5/1972 | Ludwig | 524/110 |
| 4,123,400 | 10/1978 | Gay | 524/317 |

FOREIGN PATENT DOCUMENTS

| | | |
|---|---|---|
| 167174 | 8/1986 | European Pat. Off. ......... 524/110 |
| 1569407 | 10/1970 | Fed. Rep. of Germany . |
| 2550647 | 5/1976 | Fed. Rep. of Germany . |
| 2600516 | 7/1976 | Fed. Rep. of Germany . |
| 2728862 | 1/1978 | Fed. Rep. of Germany . |
| 948506 | 4/1961 | United Kingdom . |
| 1511621 | 5/1978 | United Kingdom . |
| 1529463 | 10/1978 | United Kingdom . |

Primary Examiner—Morton Foelak
Assistant Examiner—Kriellion Morgan
Attorney, Agent, or Firm—Fisher, Christen & Sabol

[57] ABSTRACT

Stabilizer mixtures for vinyl chloride polymerizates for the improvement of the initial clarity and the heat constancy thereof. The stabilizer mixture contains nitrogen-free 3,5-substituted tetrahydropyrane-2,4,6-trione compounds of the formula:

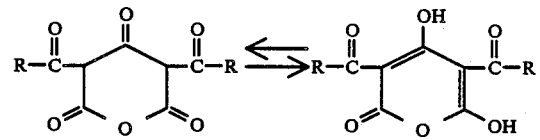

wherein R is a substituted or unsubstituted alkyl radical having 1 to 6 C atoms, and a metal salt of an organic acid and/or a metal phenolate.

10 Claims, 2 Drawing Figures

STABLIZER MIXTURES FOR VINYL CHLORIDE POLYMER MASSES

BACKGROUND OF THE INVENTION

1. Field of the Invention

The invention is related to stabilizer mixtures of vinyl chloride masses.

2. Prior Art

It is known that the processing methods for polymers require relatively high temperatures. In the case of these temperatures which can reach up to 200° C., the vinyl chloride polymerizates are noticeably decomposed which expresses itself strongly in the change of their color as well as in the change of their mechanical characteristics. In order to prevent such disadvantageous decomposition, the polymerizates have been mixed with stabilizers, such as, nitrogen-free keto compounds which are used alone or together with metal salts of organic carboxylic acids (German Pat. No. 1,569,407). Of such keto compounds dehydracetic acid (DHS) has proven itself above all others in practice. But DHS was not satisfactory with regard to its solubility for fluid stabilizer systems and with regard to its strong inclination for plating out. However, the keto compounds, customarily used in practice, such as, stearoyl benzoyl methane or 1-phenyl-5-methylhexandione, have also been used (German Patent Application No. 2,600,516 and German Patent Application No. 2,728,862). But these compounds also are not completely sufficient with respect to heat constancy, and in the case of the stearoyl benzoyl methanes, additionally with regard to the area of application limited to Ca/Zn-stabilizers.

BROAD DESCRIPTION OF THE INVENTION

An object of the invention is to provide new co-stabilizer mixtures for polyvinyl chloride which eliminate the prior art disadvantages set out above. Another object of the invention is to provide polyvinyl chloride containing such new co-stabilizer mixtures. Other objects and advantages of the invention are set out herein or are obvious herefrom to one skilled in the art.

The objects and advantages of the invention are achieved by the compositions and processes of the invention.

The invention involves co-stabilizer mixtures for vinyl chloride polymerizates for the improvement of the initial clarity and the heat constancy of such polyvinyl chlorides. The co-stabilizer mixture are comprised of nitrogen-free 3,5-substituted tetrahydropyrane-2,4-6-trione compounds having the formula:

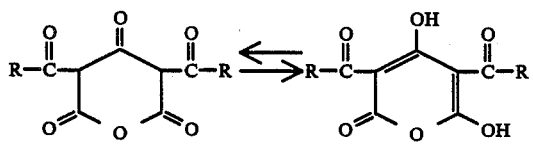

wherein R is a substituted or unsubstituted alkyl radical having 1 to 6 carbon atoms, and a metal salt of an organic acid and/or a metal phenolate. The stabilizer mixtures for vinyl chloride polymer masses result in a clear improvement of the initial clarity and the heat constancy. The mixture of 3,5-substituted tetrahydrophyrane-2,4-6-triones, as new co-stabilizer components, and one or more metal salts of organic acids and/or metal phenolates are preferably used in combination with additional co-stabilizers.

DETAILED DESCRIPTION OF THE INVENTION

Figure 1:
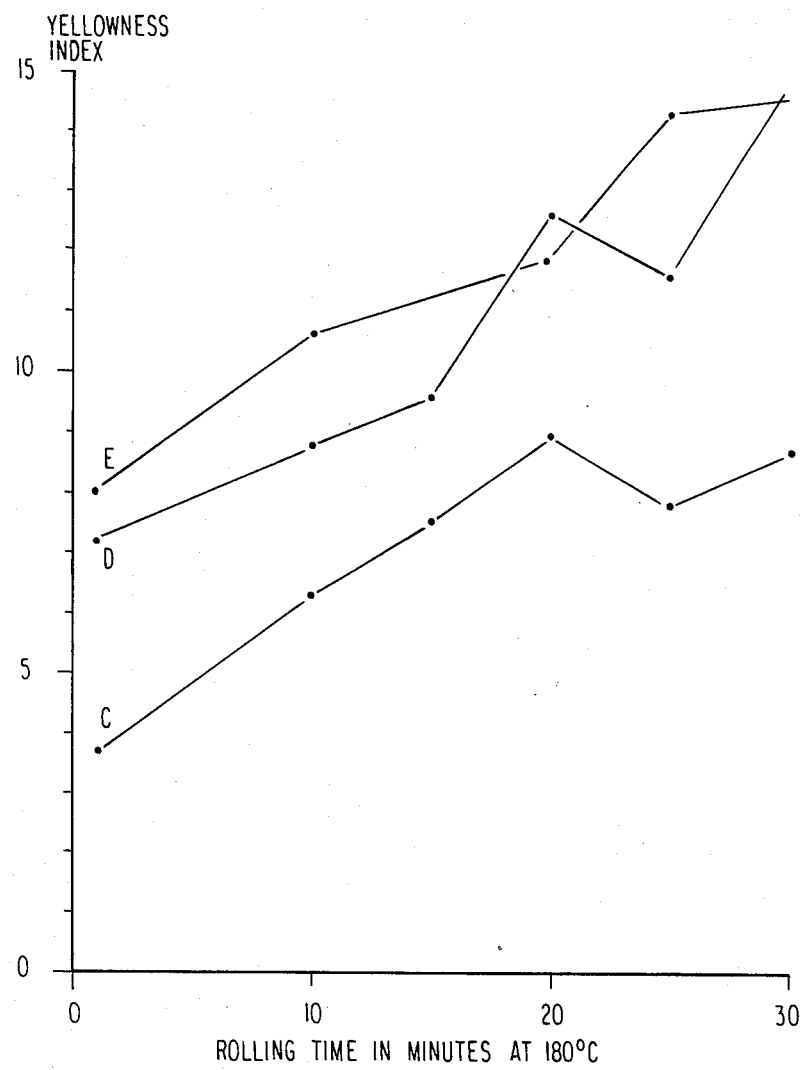
FIG. 1 is a graph of the yellowness index versus rolling time for Example 2.

As used herein, all parts, ratios, proportions and percentages are on a weight basis unless otherwise stated herein or otherwise obvious herefrom to one skilled in the art.

These new stabilizers are used effectively in a quantity of 0.01 to 2.5 percent, preferably in a quantity of 0.05 to 0.15 percent, related to the weight of the polymerizate.

The quantity of metal salts of organic carboxylic acids and/or phenolates is effectively 0.05 to 10 percent, advantageously 1 to 8 percent, related to the polymer. As the polymer, homopolymers of the vinyl chloride and copolymers of vinyl chloride with, for example, vinyl ether, vinyl ester and acrylic ester, are examples.

The trione co-stabilizers of the invention can be present in the keto- and/or enol form and can be produced easily as described in German OS No. 2,550,647. Effectively, such triones are used where R is a substituted or unsubstituted alkyl radical having 1 to 6 carbon atoms. Preferably 3,5-diacetyl tetrahydropyrane-2,4,6-trione is used.

Useful metal salts of organic carboxylic acids are those formed from a monovalent or bivalent metal and an aliphatic or aromatic carboxylic acid radical. Effectively, alkali and alkaline earth metals, such as Li, Na, K, Mg, Ca and Ba, as well as metals like Zn, Pb, Cd, Sn and Sb, are used. Ethyl hexanoates, octoates, stearates, oleates, laurates, palmitates, myristates, ricinoleates, benzoates and mixtures from $C_9$–$C_{10}$ acids, as well as phenolates and phthalates, are effectively used as the aliphatic or aromatic carboxylic acid radicals. Especially advantageous metal salts which are used separately or effectively as a mixture of two salts are Ca/Zn, Ca/Mg/Zn and Ba/Zn salts. It is advantageous to add to the mixture additional co-stabilizers, such as, organic phosphites (for example, diphenylisodecyl phosphite), epoxyized linseed- or soy oils or alkyl epoxy stearates or oleates.

The stabilizer compounds according to the invention can be worked into the PVC polymerizates along with other additives, such as, softeners, gliding agents, pigments, fillers, antioxidants, light stabilizers and other auxiliary agents.

The production of the polymer masses according to the invention can be accomplished in the following known manner:

The various stabilizers can be mixed either individually or in the form of a premixture with the softener. Into this mixture, the polymerizate is then worked in. All of the customary methods of operation in this field are suitable for the production of the mixture of the various components. Advantageously, the homogenizing of the mass is accomplished in a mixer, and at the same time better homogenization is achieved by operating at an elevated temperature. This temperature can amount for example to about 100° C. Depending on the type of PVC used (emulsion-suspension-mass) and according to the content of softener, there develops in such case a dry blend or a fluid paste.

The mixture can be processed further with the help of any method of operation customary for the processing of PVC mixtures, such as, extrusion, blow extrusion, calandering, injection casting, rotation casting, centrifugal casting or spreading on a possibly nonadhesive carrier metal.

By way of summary, the invention provides improvement in the initial clarity and heat constancy of vinyl chloride polymer masses by the inclusion of stabilizer mixtures which contain a new 3,5-substituted tetrahydropyrane-trione co-stabilizer plus one, two or more metal salts or organic acids and one, two or more metal phenolates.

The invention is further explained by the following examples.

EXAMPLE 1

For the plate-out test, mixture A composed of:
100.00 parts of suspension-PVC, K-value 70
30.00 parts of dioctylphthalate as softener
1.50 parts of Ca/Zn stearate-, decanate-stabilizer, additionally containing phosphite as co-stabilizer
0.08 parts of 3,5-diacetyltetrahydropyrane-2,4,6-trione as co-stabilizer
was produced.

As a comparison, corresponding mixture B was produced in which 3,5-diacetyl tetrahydropyrane-2,4,6-trione as co-stabilizer was replaced by 0.08 parts of dehydracetic acid.

Execution of the plate-out test:

To each of mixtures A and B to be examined, an addition of 0.1 part of a red pigment customary for the plate-out test was added to 100 parts of each such mixture. After a rolling time of 7 minutes at 165° C. on the mixed roller mechanism, the foils which developed were pulled off and discarded. The plate-out located on the rollers was received by means of a so-called cleaning mixture of white pigmented PVC. The rolling time amounted to 3 minutes. The degree of the red coloration of this cleaning foil was the measure for the intensity of the plate-out formation. The degree of the red coloration (+a-value) was measured with a Hunterlab-colorimeter [R. S. Hunter, J. Opt. Soc. Am. 48, 985 ff (1958); R. S. Hunter, Official Digest. Fed. of Paint and Varnish Produc. Clubs Philadelphia, 35, 350 ff (1963) No. 459]. The results are:

TABLE I

| Co-stabilizers (mixture) | | Type | Red Coloration | Optical Impression |
|---|---|---|---|---|
| (A) | 3,5-diacetyl-tetrahydropyrane-2,4,6-trione | invention | +1.82 | white |
| (B) | dehydracetic acid | comparison | +10.96 | pink |

EXAMPLE 2

For the rolling test, Hart-PVC mixture C consisting of:
100.00 parts of suspension-PVC, K-value 70
10.00 parts of dioctyl phthalate
1.50 parts of Ba/Zn oleate-, decanate-stabilizer as co-stabilizer phosphite containing
0.08 parts of 3,5-diacetyltetrahydropyrane-2,4,6-trione as co-stabilizer
was produced.

As a comparison, corresponding mixture D with 0.08 parts of stearoylbenzoyl methane and corresponding mixture E with 0.08 parts of 1-phenyl-5-methylhexandione instead of with 3,5-diacetyltetrahydropyrane-2,4,6-trione were produced.

These Hart-PVC mixtures were subjected at 180° C. to the endurance rolling test. The discoloration of the patterns was measured with a Hunterlab-colorimeter at certain time intervals. From the measuring values obtained, i.e., the red value (+a), yellow value (+b) and the white value (+L), the yellowness indices was calculated and is stated in the following table. The results are:

TABLE II

| Co-stabilizers (Mixture) | | Type | Yellowness Indices | | | | | |
|---|---|---|---|---|---|---|---|---|
| (C) | 3,5-diacetyltetrahydropyrane-2,4,6-trione | invention | 3.7 | 6.3 | 7.5 | 8.9 | 7.8 | 8.7 |
| (D) | stearoylbenzoylmethane | comparison | 7.2 | 8.8 | 9.6 | 12.6 | 11.6 | 14.8 |
| (E) | 1-phenyl-5-methylhexanedione | comparison | 8.0 | 10.6 | — | 11.9 | 14.3 | 14.6 |
| | rolling time at 180° C. in minutes | | 1 | 10 | 15 | 20 | 25 | 30 |

The results of these experiments are shown in FIG. 1.

EXAMPLE 3

Mixture F was produced according to the following formula which is suitable particularly for the production of bottles according to the process below:
100.00 parts of suspension-PVC K-value 70
8.00 parts of copolymerizate as butadiene, styrol and methyl methacrylate as means for the improvement of the impact resistance
0.80 parts of waxes as lubricants and/or gliding agents
1.00 parts of additional customary processing auxiliary means
4.00 parts of epoxyized soy oil
0.40 parts of Ca-stearate
0.13 parts of Zn-stearate
0.10 parts of 3,5-diacetyltetrahydropyrane-2,4,6-trione as co-stabilizer.

As a comparative formula, corresponding mixture H with dehydracetic acid and corresponding mixture G with stearoylbenzoyl methane instead of with 3,5-diacetyltetrahydropyrane-2,4,6-trione as costabilizer were produced.

These bottle formulas were subjected corresponding to Example 2 to the rolling test at 180° C. The discoloration of the samples were likewise recorded according to Example 2 at certain time intervals with a Hunterlab-colorimeter. From the values, the following yellowness indices were determined. The results are:

TABLE III

| Co-stabilizers (Mixture) | | Type | Yellowness Indices | | |
|---|---|---|---|---|---|
| (F) | 3,5-diacetyl-tetrahydropyrane-2,4,6-trione | invention | 10 | 56 | 82 |
| (G) | stearoylbenzoyl methane | comparison | 18 | 108 | 137 |

TABLE III-continued

| Co-stabilizers (Mixture) | | Type | Yellowness Indices | | |
| --- | --- | --- | --- | --- | --- |
| (H) | dehydracetic acid | comparison | 10 | 67 | 96 |
| (I) | without additive | comparison | 32 | 124 | 155 |
| rolling time at 180° C. in minutes | | | 2 | 10 | 15 |

Figure 2:
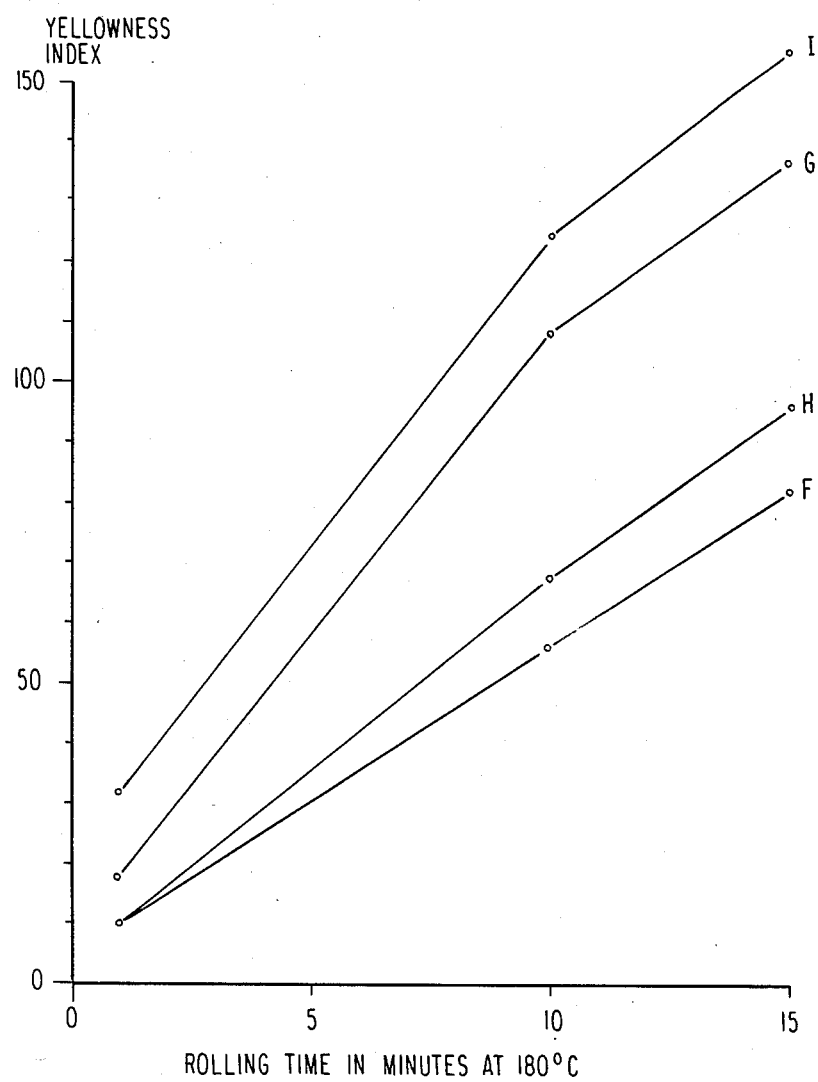
FIG. 2 is a graph of the yellowness index versus rolling time for Example 3.

The results of these experiments are shown in FIG. 2.

EXAMPLE 4

Bottle formulas with the same composition as in Example 3 were produced except that, instead of using 0.1 part of 3,5-diacetyltetrahydropyrane-2,4,6-trione, mixture K with 0.1 part of 3,5-bis(valeryl)-4,6-dihydroxy-2H-pyrane-2-on, was produced, comparative mixture L with 0.1 part of 3,5-bis(nonanoyl)-4,6-dihydroxy-2H-pyrane-2-on was produced, comparative mixture M with 0.1 part of stearoylbenzoyl methane was produced, and comparative mixture N without additive was produced.

These bottle formulas were subjected to the rolling test at 180° C. according to Example 2. Again, corresponding to Example 2, the discolorations were recorded at certain time intervals with a Hunterlab-colorimeter. The yellowness indices are given in the following table. The results are:

TABLE IV

| Co-stabilizers (Mixture) | | Type | Yellowness Indices | | |
| --- | --- | --- | --- | --- | --- |
| (K) | 3,5-bis (valeryl)-4,6-dihydroxy-2H—pyrane-2-on | invention | 14 | 25 | 37 |
| (L) | 3,5-bis (nonanoyl)-4,6-dihydroxy-2H—pyrane-2-on | comparison | 28 | 62 | 75 |
| (M) | stearoylbenzoyl-methane | comparison | 14 | 25 | 39 |
| (N) | without additive | comparison | 31 | 94 | 114 |
| rolling time at 180° C. in minutes | | | 2 | 10 | 15 |

What is claimed is:

1. Stabilizer mixture for vinyl chloride polymerizates for the improvement of the initial clarity and the heat constancy thereof, consisting essentially of (i) a nitrogen-free 3,5-substituted tetrahydropyrane-2,4,6-trione compounds of the formula:

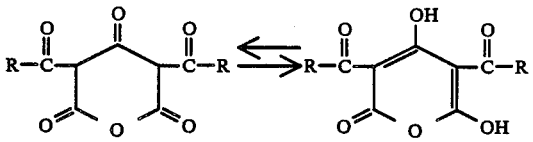

wherein R is an alkyl having 1 to 6 carbon atoms, and (ii) a salt of a monovalent or bivalent metal and an aliphatic or aromatic carboxylic acid radical.

2. Stabilizer mixture as claimed in claim 1 wherein, in salt (ii) the monovalent or bivalent metal is an alkali or alkaline earth metal.

3. Stabilizer mixture as claimed in claim 1 wherein a second salt of a monovalent or bivalent metal and an aliphatic or aromatic carboxylic acid radical is present.

4. Stabilizer mixture as claimed in claim 1 wherein diphenylisodecyl phosphite, epoxyized linseed oil, epoxyized soy oil, an alkyl epoxy stearate or an alkyl epoxy oleate is present.

5. Stabilizer mixture as claimed in claim 1 wherein the monovalent or bivalent metal is Li, Na, K, Mg, Ca, Ba, Zn, Pb, Cd, Sn, Sb, Ca/Zn, Ca/Mg/Zn or BaZn, and the aliphatic or aromatic carboxylic acid radical is octoate, stearate, oleate, laurate, palmitate, myristate, ricinoleate, benzoate, hexanoate or a mixture of $C_9$–$C_{10}$ acid radicals.

6. Stabilizer mixture as claimed in claim 1 wherein 0.01 to 2.5 weight percent related to the polymerizate, of the nitrogen-free 3,5-substituted tetrahydropyrane-2,4,6-trione compounds is used.

7. Stabilizer mixture as claimed in claim 1 wherein 0.05 to 0.15 weight percent, related to the polymerizate, of the nitrogen-free 3,5-substituted tetrahydropyrane-2,4,6-trione compound is used.

8. Stabilizer mixture as claimed in claim 1 wherein diphenylisodecyl phosphite is present.

9. Vinyl chloride polymerizate mass containing the stabilizer mixture of claim 1.

10. Vinyl chloride polymerizate mass as claimed in claim 1 which also contains a softener, a gliding agent, a pigment, a filler, an antioxidant and a light stabilizer.